United States Patent [19]

Hampshire

[11] Patent Number: 5,305,447
[45] Date of Patent: Apr. 19, 1994

[54] MULTI-TASK OPERATING SYSTEM FOR A DISC DRIVE

[75] Inventor: Randall D. Hampshire, Edmond, Okla.

[73] Assignee: Seagate Technology, Inc., Scotts Valley, Calif.

[21] Appl. No.: 738,584

[22] Filed: Jul. 31, 1991

[51] Int. Cl.⁵ ............................................. G06F 13/10
[52] U.S. Cl. ................................... 395/425; 395/650; 360/69
[58] Field of Search ................ 395/425, 650; 360/69

[56] References Cited

U.S. PATENT DOCUMENTS

| | | | |
|---|---|---|---|
| 3,720,920 | 3/1973 | Watson et al. | 395/775 |
| 3,883,894 | 5/1975 | Johnson | 360/78 |
| 4,068,267 | 1/1978 | Inouye | 360/75 |
| 4,314,291 | 2/1982 | Oda et al. | 360/78 |
| 4,333,117 | 6/1982 | Johnson | 360/78 |
| 4,351,044 | 9/1982 | Imanaka et al. | 369/43 |
| 4,419,701 | 12/1983 | Harrison et al. | 360/77.08 |
| 4,638,384 | 1/1987 | Stewart et al. | 360/77 |
| 4,639,798 | 1/1987 | Harrison et al. | 360/73.03 |
| 4,669,004 | 5/1987 | Moon et al. | 360/53 |
| 4,677,507 | 6/1987 | Elliott | 360/78 |
| 4,737,869 | 4/1988 | Sugaya et al. | 360/77 |
| 4,814,909 | 3/1989 | Brown et al. | 360/78.07 |
| 4,819,153 | 4/1989 | Graham et al. | 360/70 |
| 4,823,212 | 4/1989 | Knowles et al. | 360/77.08 |
| 4,864,437 | 9/1989 | Couse et al. | 360/75 |
| 4,907,107 | 3/1990 | Sakurai | 360/77.04 |
| 4,964,009 | 10/1990 | Moriya et al. | 360/135 |
| 4,965,501 | 10/1990 | Hashimoto | 318/595 |
| 4,979,055 | 12/1990 | Squires et al. | 360/69 |
| 5,005,089 | 4/1991 | Thanos et al. | 360/77.08 |
| 5,062,023 | 10/1991 | Squire | 360/78.04 |
| 5,065,382 | 11/1991 | Seko et al. | 369/44.26 |
| 5,095,471 | 3/1992 | Sidman | 369/43 |
| 5,128,812 | 7/1992 | Uno | 360/78.06 |
| 5,150,266 | 9/1992 | Albert | 360/78.04 |
| 5,153,787 | 10/1992 | Sidman | 360/77.05 |
| 5,164,931 | 11/1992 | Yamaguchi et al. | 369/44.29 |

Primary Examiner—Joseph L. Dixon
Assistant Examiner—David L. Robertson
Attorney, Agent, or Firm—Kinney & Lange

[57] ABSTRACT

A multi-task system employs a single interrupt occurring at fixed time intervals to initiate the control functions. The actuator control, servo control and spindle control routines are operated on a priority basis so that if a control function having a high priority is not ready to be executed, the processor immediately performs execution of the next available control function. More particularly, the spindle control process is operated in the foreground with the actuator control and servo control routines operated on an interrupt basis of the spindle control routine. Upon receipt of the interrupt signal, priority is first given to an actuator control routine for execution. Upon completion of the actuator control routine, or if the actuator control is not ready to be executed, access is given to a servo control routine. At the conclusion of the servo control routine, the interrupt exits to the spindle control routine. The control functions are performed by routines which themselves are divided into subroutines, with one subroutine of each background function being executed during each interrupt cycle.

20 Claims, 10 Drawing Sheets

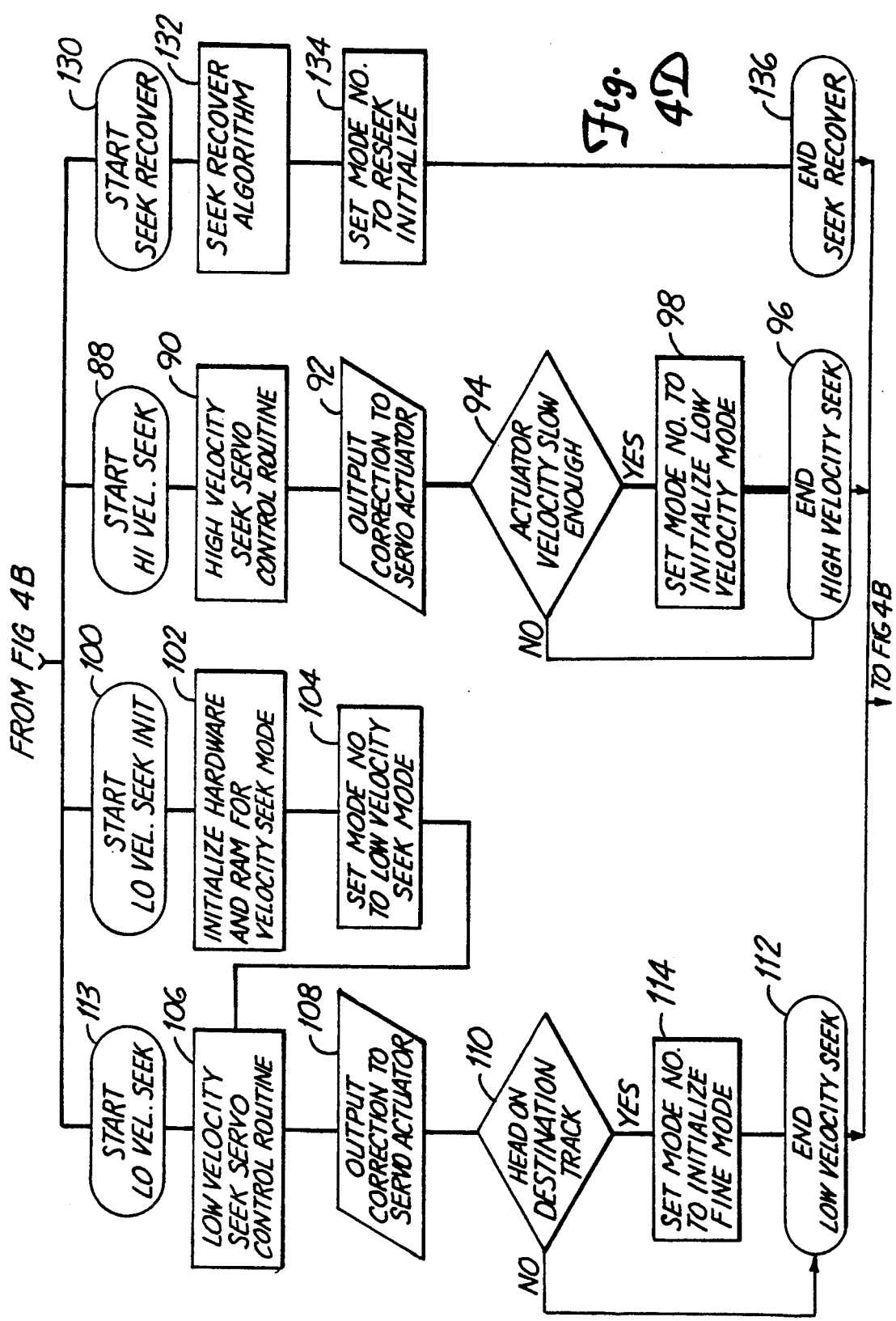

MULTI-TASK OPERATING SYSTEM FOR A DISC DRIVE

CROSS-REFERENCE TO RELATED APPLICATIONS

The present application is related to the following patent applications, all assigned to the same assignee as the present application.

Miller, "Error Tolerant Multi-Frame Index Generation Scheme", Ser. No. 07/560,438, filed Jul. 31, 1990.

Hampshire, "Correction of Current Feedback Offset for Disc Drive Servo Systems", Ser. No. 07/734,938, filed Jul. 24, 1991.

Duffy et al., "Hard Disc Drive with Improved Servo System", Ser. No. 07/738,053, filed Jul. 31, 1991.

Funches et al., "Compensating for Variations in Torque Capability of Voice Coil Motors", Ser. No. 07/738,793, filed Jul. 31, 1991.

McKenzie, "Acoustic Noise Reduction Using a Time Varying Exponential Demand Filtering", Ser. No. 07/738,806, filed Jul. 31, 1991.

BACKGROUND OF THE INVENTION

This invention relates to data storage systems employing rotating media, and more particularly to an operating system for controlling plural operations of a disc drive system. While the present invention will be described in connection with magnetic disc drive systems employing hard discs, it will be understood that the invention is useful with other types of rotating storage devices.

There are three principal tasks required for operation of a hard disc drive. First, a spindle control task must accurately maintain the speed of the rotating media. Second, an actuator control task must control and maintain the position of the read/write head for track seek and centering functions. Third, a servo control task (which is actually several tasks) must (i) control communications over an interface to another processor or a host, (ii) act as a supervisor and monitor over the actuator and spindle tasks, and (iii) monitor hardware ports for fault conditions. The servo control tasks are event driven; the actuator control task of track centering and the spindle control task are time driven.

Prior disc drive systems employed dedicated processors to handle servo control tasks. Spindle control and actuator control tasks were handled through separate analog circuits. More recently, some disc drive controllers have eliminated the spindle control analog circuits and added a spindle control program to the disc drive controller. The spindle control routine was operated on an interrupt of the servo control routine, so that the servo control program was periodically interrupted to execute a spindle control program. However, there are times when the servo control is performing real time updates to the analog actuator control circuits and cannot be interrupted. Therefore, the interrupt of the servo control for spindle control was not always satisfactory.

Both the servo control routine and the spindle control routine employ idle loops during which the programs are waiting for changes in the hardware. During these times, the processor is performing no other program executions, except for waiting for a bit to change, a timer to time out, or some other change in the hardware.

Attempts have been made to incorporate actuator control tasks into the processor as a digital operation, examples being found in the patents to Squires et al., U.S. Pat. No. 4,979,055 and to Graham et al., U.S. Pat. No. 4,819,153. Each of these patents describes a processor control system in which the servo control routine is interrupted periodically to perform spindle control and/or actuator control functions. More particularly, in the Squires et al. patent, the actuator control, spindle control and read/write control are supported as background tasks to the foreground task of controlling the transfer of data with respect to the host processor. A sector task is composed of sub-tasks, including spindle control, read/write control and actuator control which are initiated during the sector gap prior to the beginning of a servo burst. Timed interrupts during the sector period initiate each of the respective tasks. Hence, Squires et al. achieves multi-tasking operation through a time-based task scheduling of the sector using pre-established interrupts establishing separate time slots for each control function.

One of the difficulties with the interrupt scheme based on interrupting the servo control routine, such as that employed by Squires et al., is that important servo control routines might be interrupted at inopportune times, such as when the servo control is performing a real time update to the actuator control. Further, such a design does not fully utilize the capabilities of the processor. More particularly, if a particular control function, such as the actuator control, is not ready to be executed during its assigned time slot, defined by its interrupt, the processor remains idle for the entire time slot.

SUMMARY OF THE INVENTION

The present invention is directed to a multi-task system wherein a single interrupt occurring at fixed time intervals initiates the control subroutines. The actuator control, servo control and spindle control subroutines are operated on a priority basis so that if a control function having a high priority is not ready to be executed, the processor immediately performs execution of the next available control function.

In the preferred form of the invention, the spindle control process is operated in the foreground with the actuator control and servo control routines operated on an interrupt basis of the spindle control routine. Upon receipt of the interrupt signal, priority is first given to the actuator control routine for execution. Upon completion of the actuator control routine, or if the actuator control is not ready to be executed, control is given to the servo control routine. At the conclusion of the servo control routine, the interrupt exits to the spindle control routine. Any idle loops occur there.

In a preferred form of the invention, the control functions are performed by routines which themselves are divided into subroutines. Timed interrupts occurring at a regular basis, for example, every 42 microseconds, initiate the subroutines on a priority basis.

BRIEF DESCRIPTION OF THE DRAWINGS

FIGS. 4A-4F, taken together, is a detailed flow chart of the actuator control process of the operating system according to the presently preferred embodiment of the present invention.

DETAILED DESCRIPTION OF THE PREFERRED EMBODIMENT

Figure 1:
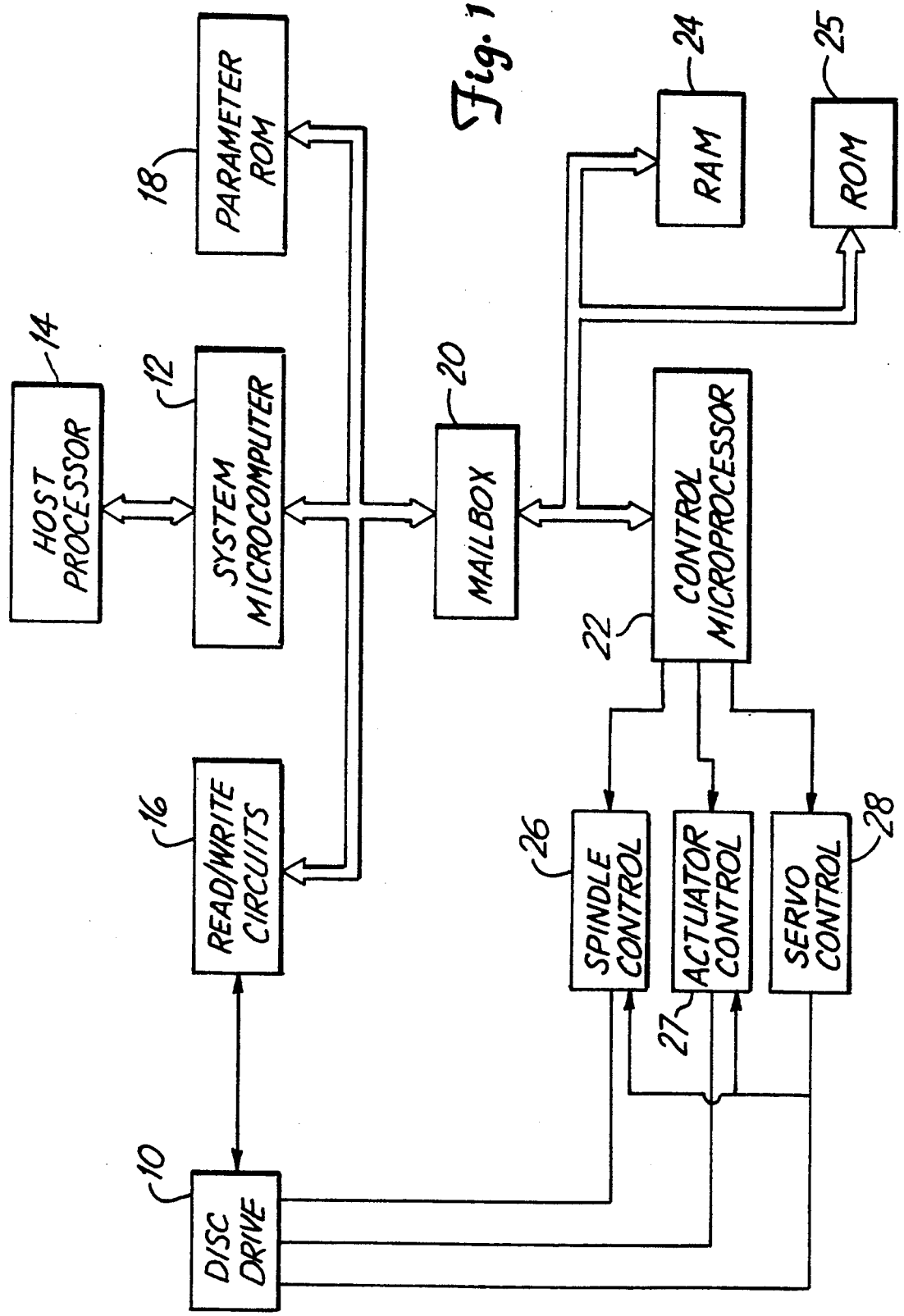
FIG. 1 is a block diagram of a hardware configuration for executing the operating system according to the presently preferred embodiment of the present invention.

FIG. 1 is a block diagram of the processor control system for disc drive 10. The system includes a system microcomputer 12 connected to host processor 14 to receive commands and to transfer data between the host and microcomputer. Read/write circuits 16 are connected between system microcomputer 12 and disc drive 10 to transfer data between the microcomputer and the read/write heads of the disc drive to thereby store and record data to and from the rotating media (not shown) which is part of the disc drive. The read/write circuits also provide data track address and track center data to microcomputer 12 for storage in a random access memory (RAM) which is part of the microcomputer. Parameter read only memory (ROM) 18 contains parameter data concerning system configuration and timing, as well as the velocity profiles for seek operations. Communications mailbox 20 provides communications between system microcomputer 12, read/write circuits 16 and ROM 18 (on one side) and control microprocessor 22 (on the other side). Microprocessor 22 operates to store data in random access memory (RAM) 24, execute programs and velocity profiles for such operations out of read only memory (ROM) 25, and operates spindle control 26, actuator control 27 and servo control 28. As described in the aforementioned Duffy et al. application, microprocessor 22, RAM 24 and ROM 25 are preferably embodied in a TI TMS320C15 microprocessor operated in the microcomputer mode. Spindle control 26 may, for example, be the motor control circuit for operating the spindle control motor (not shown), and actuator control 27 may be the linear or voice coil motor for operating the read/write actuator assembly to position the read/write head over a designated data track or cylinder. Servo control 28 comprises such control devices for the disc drive as may be driven by the servo control routines (to be described), other than the spindle motor or head actuator. The servo control 28 may comprise such sundry apparatus as for controlling temperature compensation, operating the arm lock, controlling the power amplifier for the actuator, etc.

The operating system program of the present invention is stored in RAM 24 and executed in microprocessor 22 using parameters from ROM 18 and commands issued by host processor and/or microcomputer 12 and communicated to microprocessor 22 through mailbox 20. The operating system includes a predetermined interrupt command to issue an interrupt each 42 microseconds under the control of the system clock signal from microcomputer 12.

The disc drive system described in the cross-referenced patent applications, like most disc drive systems, requires a spindle control function which is usually idle over 99 percent of the time. In the particular example, the spindle control requires a maximum of 80 microseconds of execution time over a 16.8 millisecond time interval (corresponding to 400 interrupt intervals). Consequently, the spindle control process is accorded lowest priority of the three principal processes to be performed. However, as will be more fully explained hereinafter, the spindle control process is written to execute in the foreground so that any idle loops (such as waiting for a hardware change) occurs while the spindle control has access to the processor. Further, since the spindle control is written to execute in the foreground, it is from the spindle control that the interrupts will occur to give priority first to the actuator control process and second to the servo control process. The actuator control requires between about 70 and 90 percent of the time between its timed events. In the case of the particular disc drive under consideration, the actuator control process requires between about 25 and 32 microseconds during each 42 microsecond period. The spindle control and actuator control processes are digital control algorithms that sample data at regular time intervals, execute a control program and output a correction. The servo control program, on the other hand, responds nearly instantaneously to commands from the interface and changes in the hardware. More particularly, as explained in the co-pending McKenzie et al. application, the control processor interfaces with the host processor, as well as to the data transfer processor in the controller (the latter interface being through a mailbox for purposes more fully explained in the McKenzie et al. application). The spindle control program and actuator control program are time-driven, and must execute to completion within certain periods of time. The servo control program is event-driven, designed to respond to command requests from the host interface retrieve data from microcomputer 12 through mailbox 20 and respond to changes in the hardware.

Figure 2:
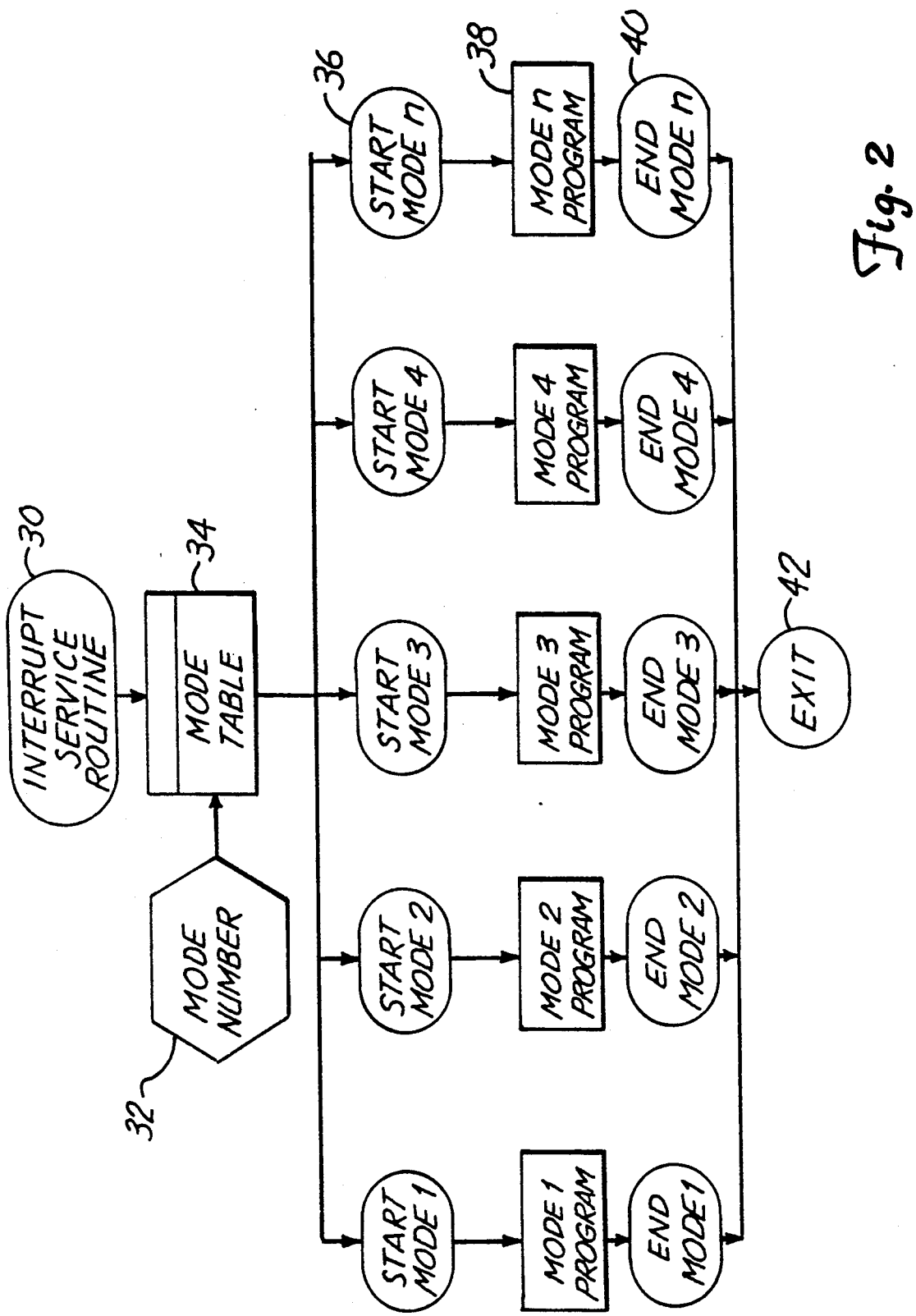
FIG. 2 is a simplified flow chart illustrating the structure of the operating system according to the present invention.

FIG. 2 is a flow chart illustrating the format of a process following an interrupt. Each process has several modes. For example, the actuator control process may include a fast access mode, slow access mode, fine control mode, test seek mode, various initialization modes, etc. The starting address of each mode is stored in a mode table located in the read only memory (ROM) 25 of microprocessor 22. Each mode is assigned a mode number. When an interrupt occurs, the interrupt handler saves the contents of process register of the microprocessor, and then retrieves the current mode number, looks up the address for that mode from the mode table and then commences executing at that address. At the end of execution of the program for that mode, the program exits to the process with the next lower priority or exits the interrupt. More particularly, if a mode of the actuator control process is executed, upon exiting from that mode, control is handed over to the servo control process. If a mode of the servo control program is executed, the interrupt is exited upon exiting the servo mode and control is handed over to the spindle control process. Thus, as shown in FIG. 2, when the interrupt signal is received at 30, the current mode number 32 causes selection from mode table 34 of the start address for the particular routine to be executed. Microprocessor 22 commences execution of the routine at step 38, ending at step 40 to exit at step 42. As illustrated in FIG. 2, the process includes several branches represented by the parallel mode routines each starting at a step 36, executing at a step 38 and ending at a step 40 to exit at the common step 42. For example, if the mode number stored in block 32 is "3", the routine branches to the address stored in mode table 34 associated with mode 3 and the program there is executed. Further, although the process is shown to exit at step 42, the operation may continue into another process, as to be explained in connection with FIG. 3.

Figure 3:
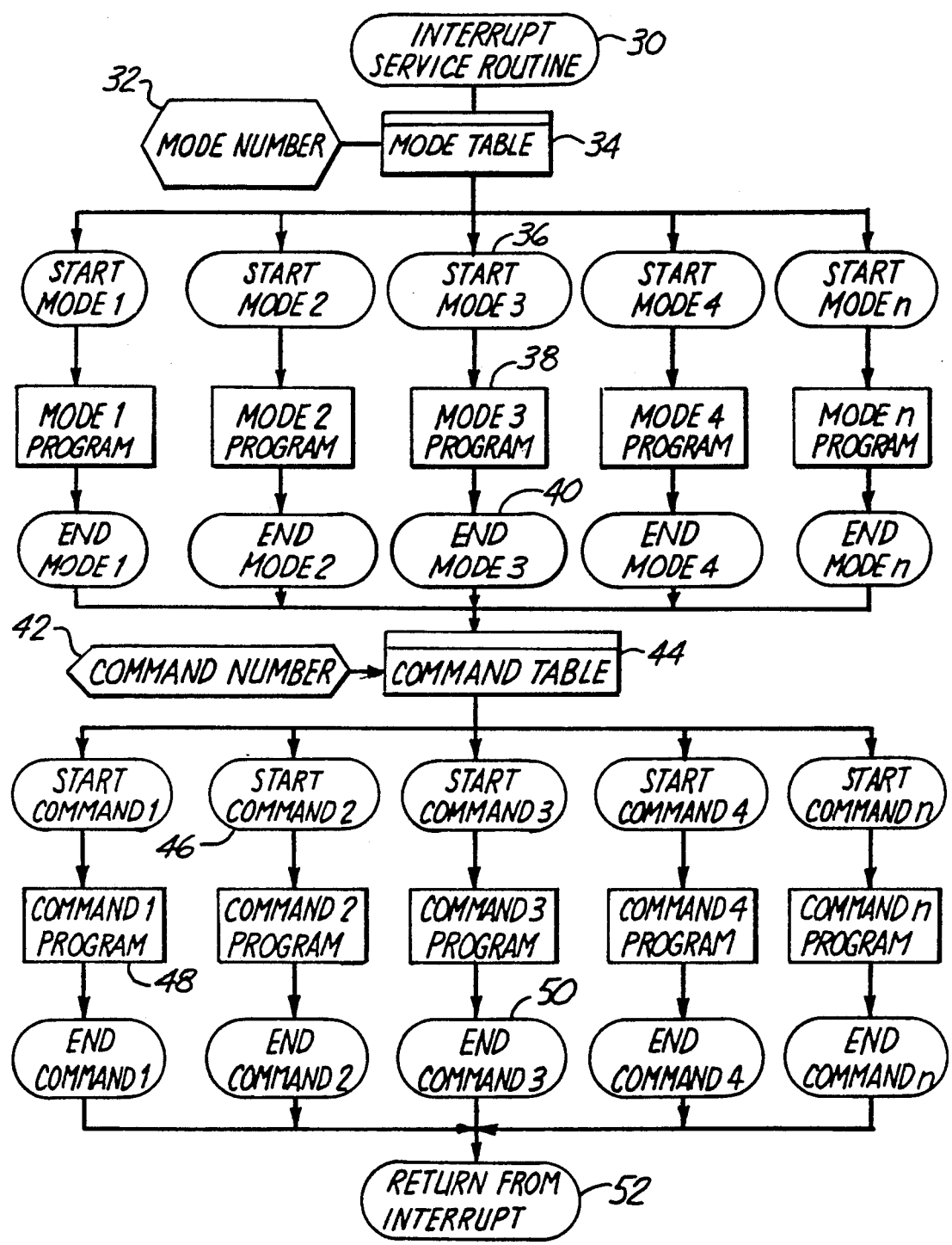
FIG. 3 is an expanded version of the flow chart illustrated in FIG. 2 illustration the relationship between the actuator control and servo control processes.

FIG. 3 illustrates the operation of several processes in tandem. The top half of FIG. 3 is identical to FIG. 2 and need not be further explained, except to say that the routine of the top half of FIG. 3 is the higher priority process, such as the actuator control process, and the process at the bottom of FIG. 3 is the lower priority process, such as the servo control process.

The servo control process employs command numbers 42 and command tables 44 which are distinct from the mode numbers 32 and mode table 34 employed in connection with the actuator control process. The servo control process starts at 46, executes command programs at 48 and ends at 50, much in the same manner as the mode programs are handled in connection with the actuator control process described above. The actuator control modes may require 25 to 32 microseconds each 42 microsecond interval, leaving as much as 10 to 17 microseconds for setting up, executing and exiting the servo commands. The servo control functions are coded into module parts with each part being executed during each interrupt cycle after the actuator control executes. The principal distinction between the mode and command operations deals with the level of control performed by the program. As will be understood, a mode program can change a mode number, but not a command number, whereas a command program can change either a mode number or a command number. Also, as will be understood, certain mode numbers cannot be changed, except by command programs. With the foregoing in mind, a more detailed description of the actuator and servo control functions will be explained, with reference to FIGS. 4A-F (which, together, comprise the flow diagram of the actuator control function), and FIGS. 5A and 5B (which illustrate the flow diagram of the servo control process).

Figure 4C:
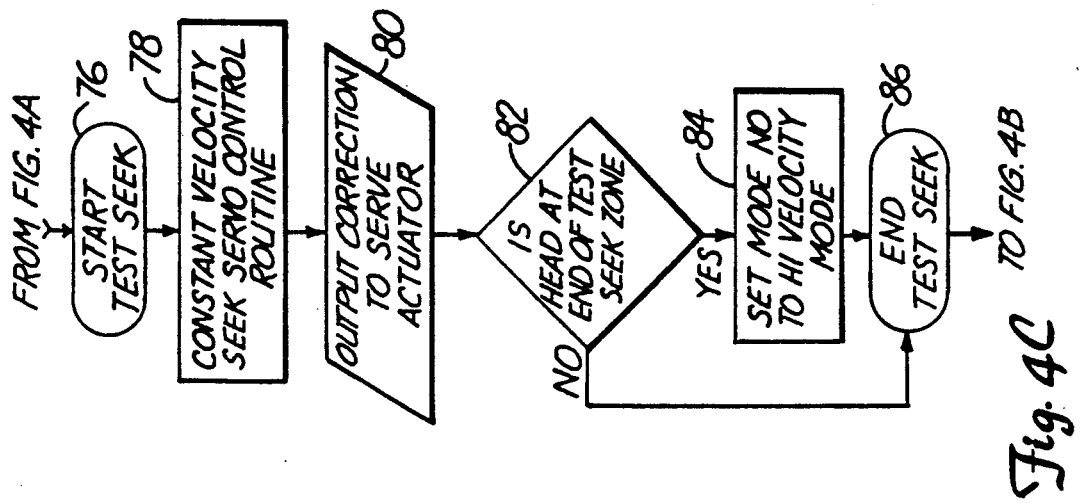
Figure 4B:
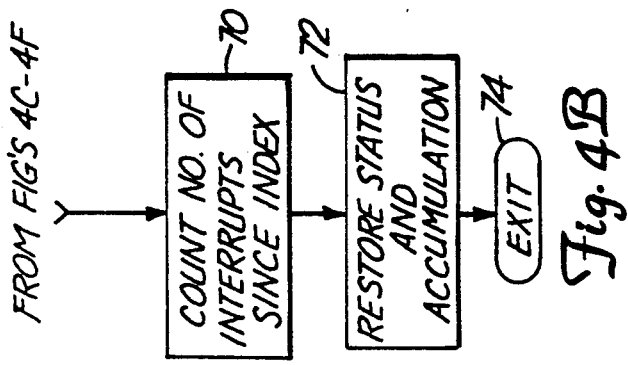
Figure 4A:
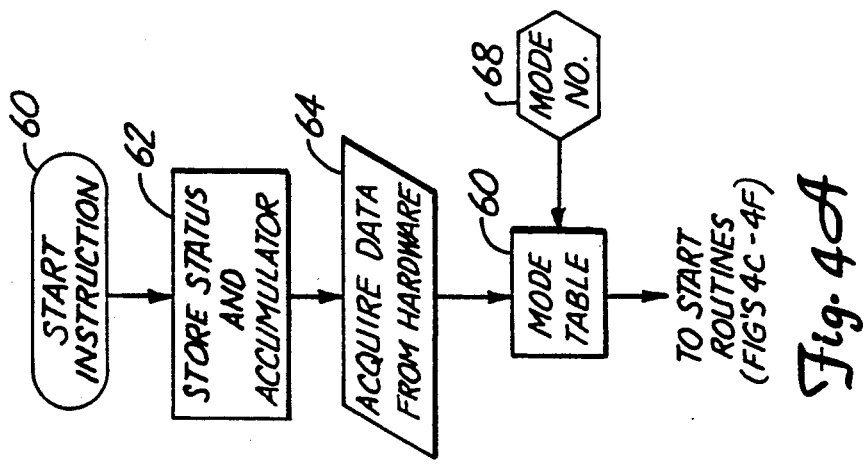

FIGS. 4A-4F, taken together, comprise the flow charts for the routines of the actuator control process. The programs forming the routines illustrated in FIGS. 4A-4F are executed by microprocessor 22 out of ROM 25. RAM 24 stores the pointers, velocity data, mode numbers and command numbers described herein. Entry into the routines for actuator control commences as illustrated in FIG. 4A upon an interrupt signal interrupts operation of the spindle control to start the actuator instruction at step 60. The status and accumulator associated with the instructions are stored at 62, and data is acquired from the hardware relating to the branch routine (FIGS. 4C-4F) to be taken. The address associated with the branch routine to be executed is identified by mode table 66 based on the mode number 68. All steps 60-68 are common to all of the routines illustrated in FIGS. 4C-4F. Once the selected routine branch illustrated in FIGS. 4C-4F is executed, the branch returns to the common exit illustrated in FIG. 4B. There, the number of interrupts since the last index is counted at 70 and the status and accumulation registers are restored at 72 prior to exiting the actuator process at step 74.

FIGS. 4C, 4D, 4E and 4F illustrate representative routines performed during each interrupt cycle. By way of example, the several parallel routines, each of which has a unique mode number, performs such activities as test seek, low velocity seek, low velocity seek initialization, high velocity seek, seek recovery, process command, fine control, fine initialize, apply new offset, seek initialize, and reseek initialize. As illustrated in FIG. 4C, if the mode number 68 indicates to start the test seek 76, microprocessor 22 executes a constant seek servo control routine at 78 and outputs, at 80, a correction to the servo motor. A decision, at 82, determines whether the head is at the end of the test seek zone, and if so, the mode number 68 is set to the mode number of the high velocity mode at step 84, and the test seek ends at 86 to input to the program illustrated in FIG. 4B. If the head is not at the end of the test seek zone, then the test seek routines ends without changing the mode number. Consequently, at the next interrupt, mode number 68 continues to indicate that of the test seek routine, and the test seek routine is repeated until the head reaches the end of the test seek zone, at which time the mode number 68 is changed to that of the high velocity mode.

The high velocity seek routine is illustrated in FIG. 4D and starts at step 88 to execute a high velocity seek servo control routine at step 90 in microprocessor 22. Output correction is provided to the servo actuator at 92. The high velocity seek servo control routine is part of the velocity profile used during seek operation. As part of that profile, the actuator velocity is slowed (after initial acceleration) so that the control is handed over to a low velocity seek mode. Therefore, at 94, a decision is made whether the actuator velocity is slow enough to make the change. If it is not, the high velocity seek ends at 96, whereas if the actuator velocity is low enough to accept a change, the mode number 68 is changed at 98 to the mode number of the initialize low velocity mode.

The low velocity seek initialization routine is also illustrated in FIG. 4D and commences at step 100 to execute the program to initialize the hardware and random access memory 24 at step 102 for low velocity seek mode. At step 104, the mode number 68 is set to that of the low velocity seek mode, and the routine immediately goes to that routine to execute the low velocity seek servo control routine at step 106. At step 108, output is directed to the servo actuator for correction, and at step 110 a decision is made as to whether or not the head is on the destination track. If it is not, the low velocity seek ends at step 112 and a return to the program illustrated in FIG. 4B is accomplished. During subsequent interrupts, the mode number 68 is that of the low velocity seek routine which is accessed at 113 whereupon the low velocity seek servo control routine 106 will be again be executed by microprocessor 22. When the head reaches the destination track, mode number 68 is set to that of the initialize fine mode at step 114.

Figure 4E:
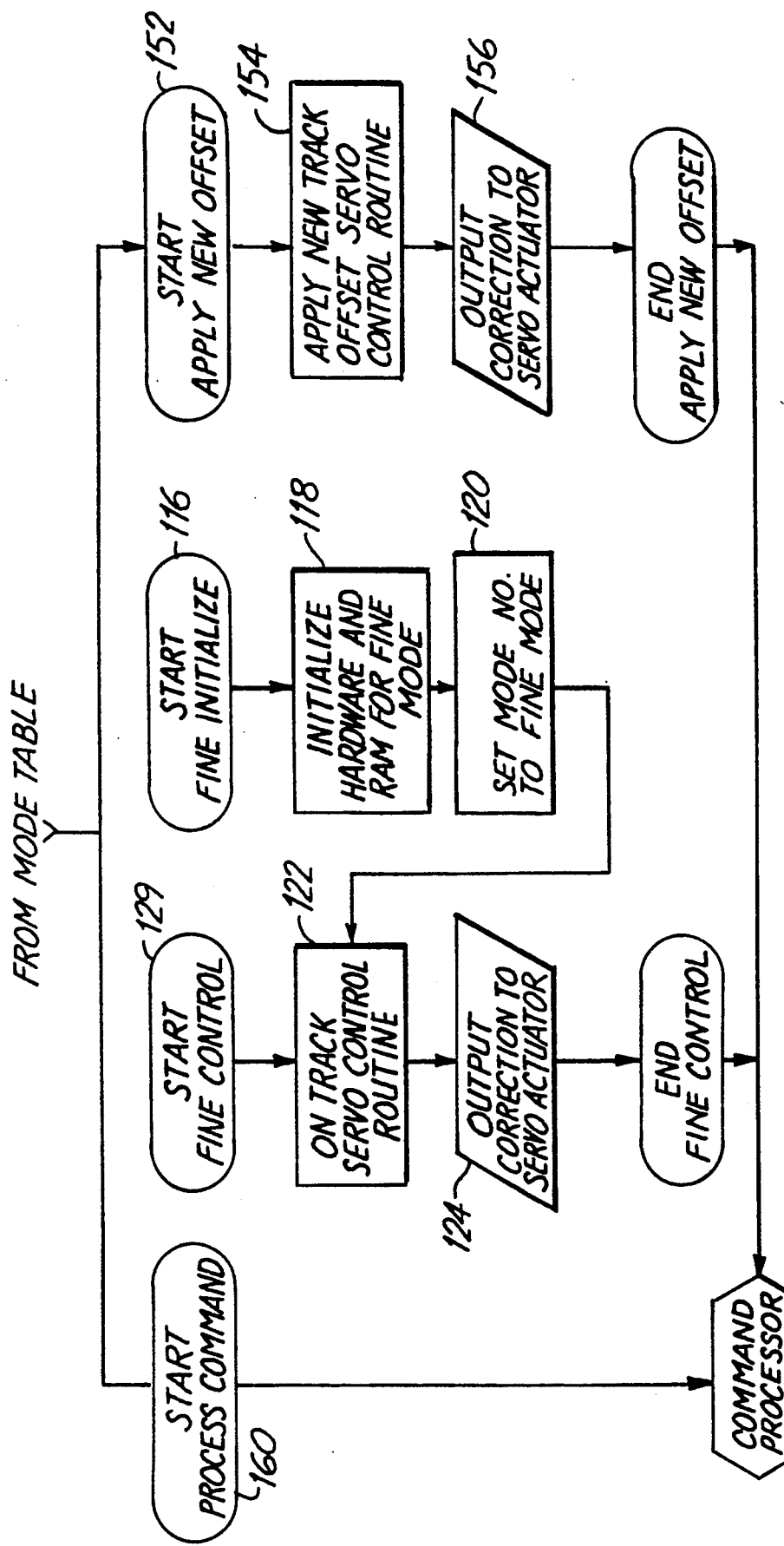
Figure 4F:
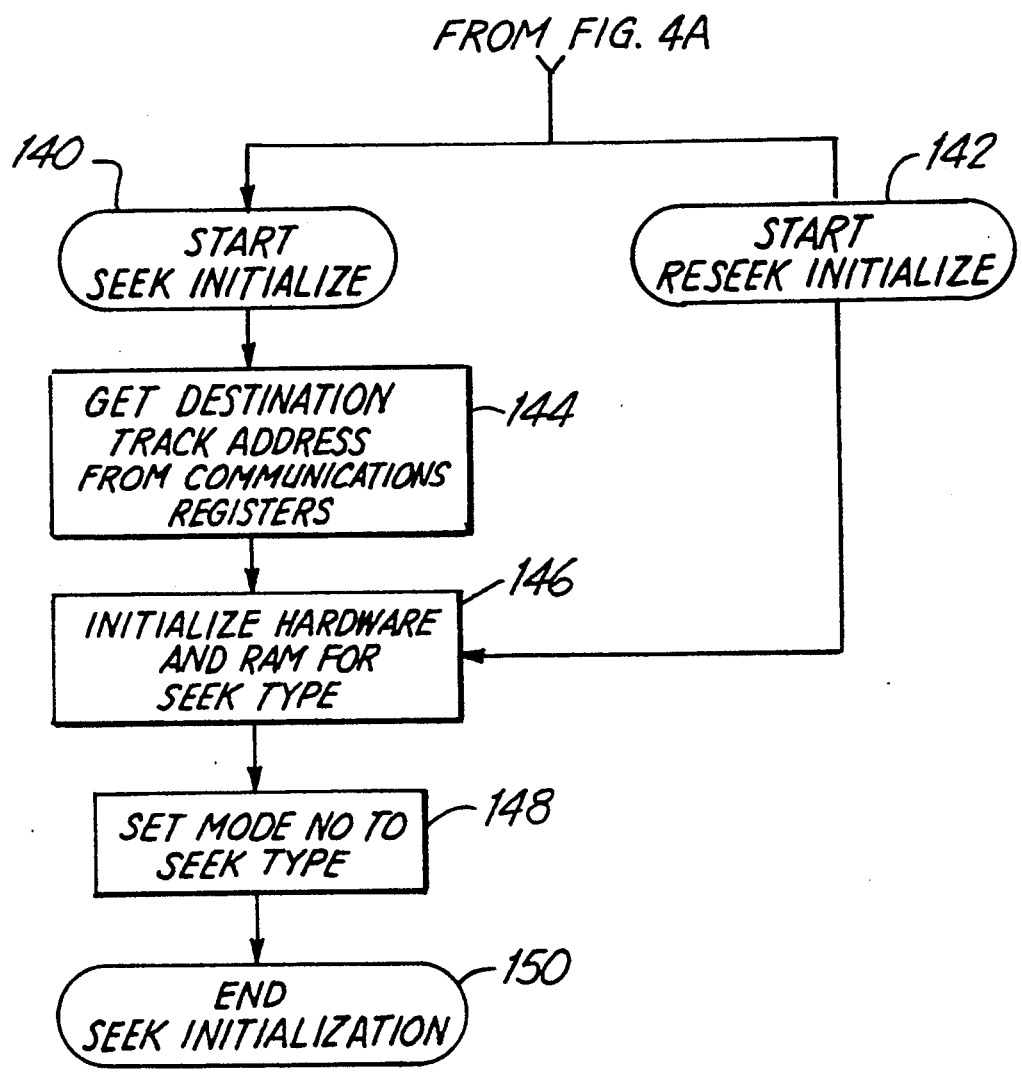

The fine initialize routine is illustrated in FIG. 4E and starts at step 116 so that at step 118 microprocessor 22 initializes the hardware and random access memory 24 for fine mode. At step 120 the mode number 68 is set to that of the fine mode. The routine immediately switches to the fine mode and microprocessor 22 executes the on-track servo routine at step 122 and outputs a correction to the servo actuator at 124. The fine control ends at step 126 with an output to the command processor at 128 prior to executing the program illustrated in FIG. 4B. The fine control routine will repeat indefinitely, entering at step 129, because the mode number 68 for the fine control cannot be changed, except under control of a servo control routine, as will be explained below.

A seek recover routine illustrated in FIG. 4D may be executed by starting the routine at step 130, executing a seek recover algorithm in microprocessor 22 at step 132, and setting the mode number 68 to the reseek initialize routine at step 134. Upon exiting the seek recover routine at step 136, the next subsequent interrupt will execute the reseek initialize routine, shown in FIG. 4F. The seek initialize and reseek initialize routines start at steps 140 and 142, respectively, with the seek initialize step executing microprocessor 22 to obtain the destination track address from the communication registers at step 144. At step 146 microprocessor 22 initializes the hardware and random access memory 24 for the specific seek type to be executed. At step 148, mode number 68 is changed to that of the specific seek type and the seek initialization is ended at 150 and returned to the program illustrated in FIG. 4B.

FIG. 4E also illustrates two other routines which are useful, one being an apply new offset routine to provide correction to the servo actuator for track offset, illustrated at steps 152, 154, 156 and 158, and a process command illustrated at step 160. The process command routine is extremely important as it permits the actuator control to do nothing, and is used when no commands are to be made to the actuator control. Thus, if there is no seek or fine control being performed, access is given to the process command to simply exit the actuator control routines.

Figure 5A:
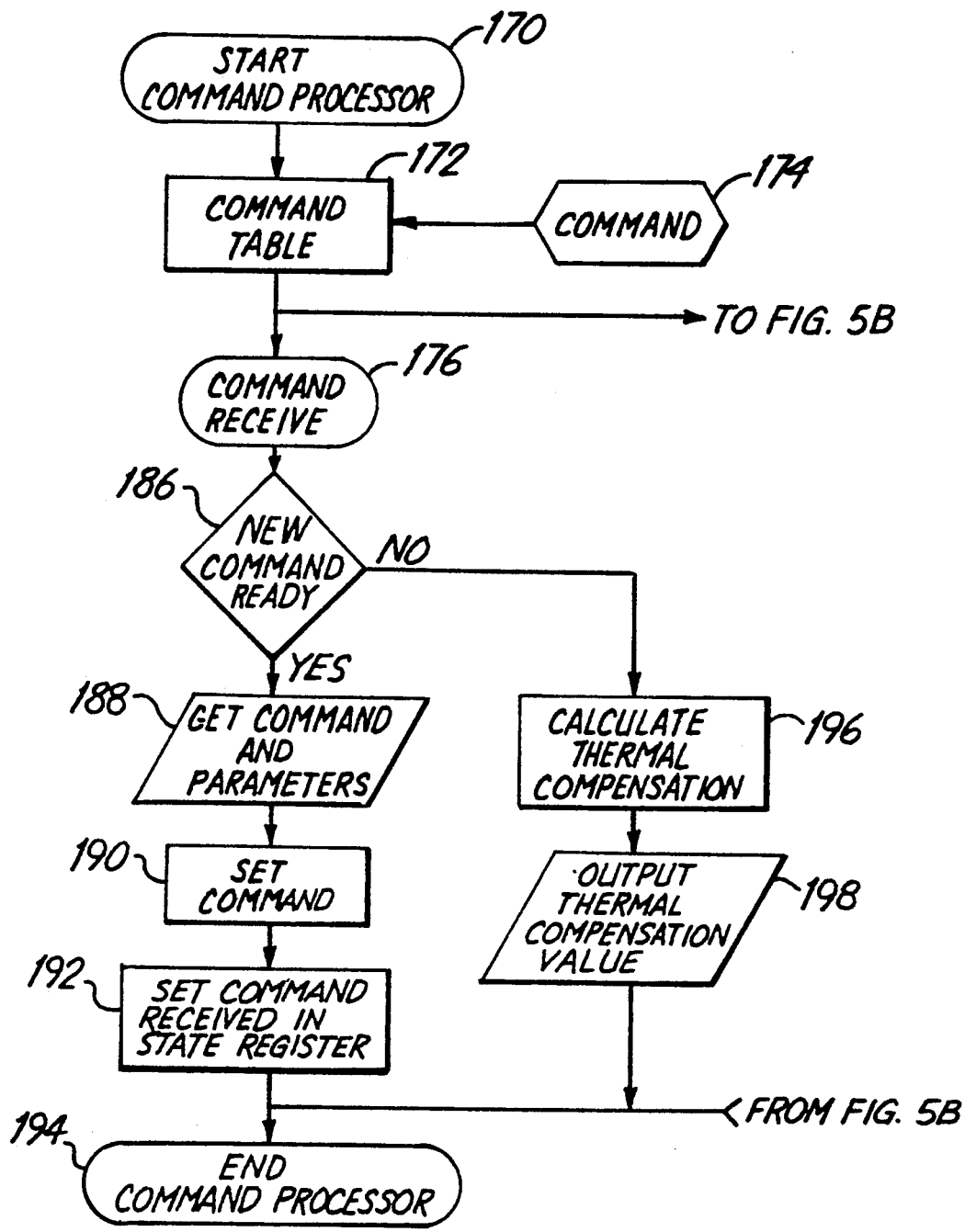
FIGS. 5A and 5B, taken together, is a detailed flow chart of a portion of the servo control process of the operating system according to the presently preferred embodiment of the present invention.

Upon exiting the actuator control routines at step 74 in FIG. 4B, access is given to the servo control routines which start at FIG. 5A at step 170. Command table 172 accesses the address at which microprocessor 22 executes the command routine, the address being determined by command table 172 in accordance with a command number 174. From the command table, the routine branches to one of several command routines, illustrated in parallel in FIGS. 5A and 5B, to accomplish seek, on track, check track, command receive and a variety of other commands. A typical disc drive system may have as many as eighty command routines to which to branch, the particular command routines illustrated in FIGS. 5A and 5B being illustrative of the operation of the system. The particular command routine executed by microprocessor 22 is determined by the command number 174 and starts at step 176, 178, 180, 182 or 184, etc. Step 184 represents the numerous other commands to which the routine may branch.

Figure 6:
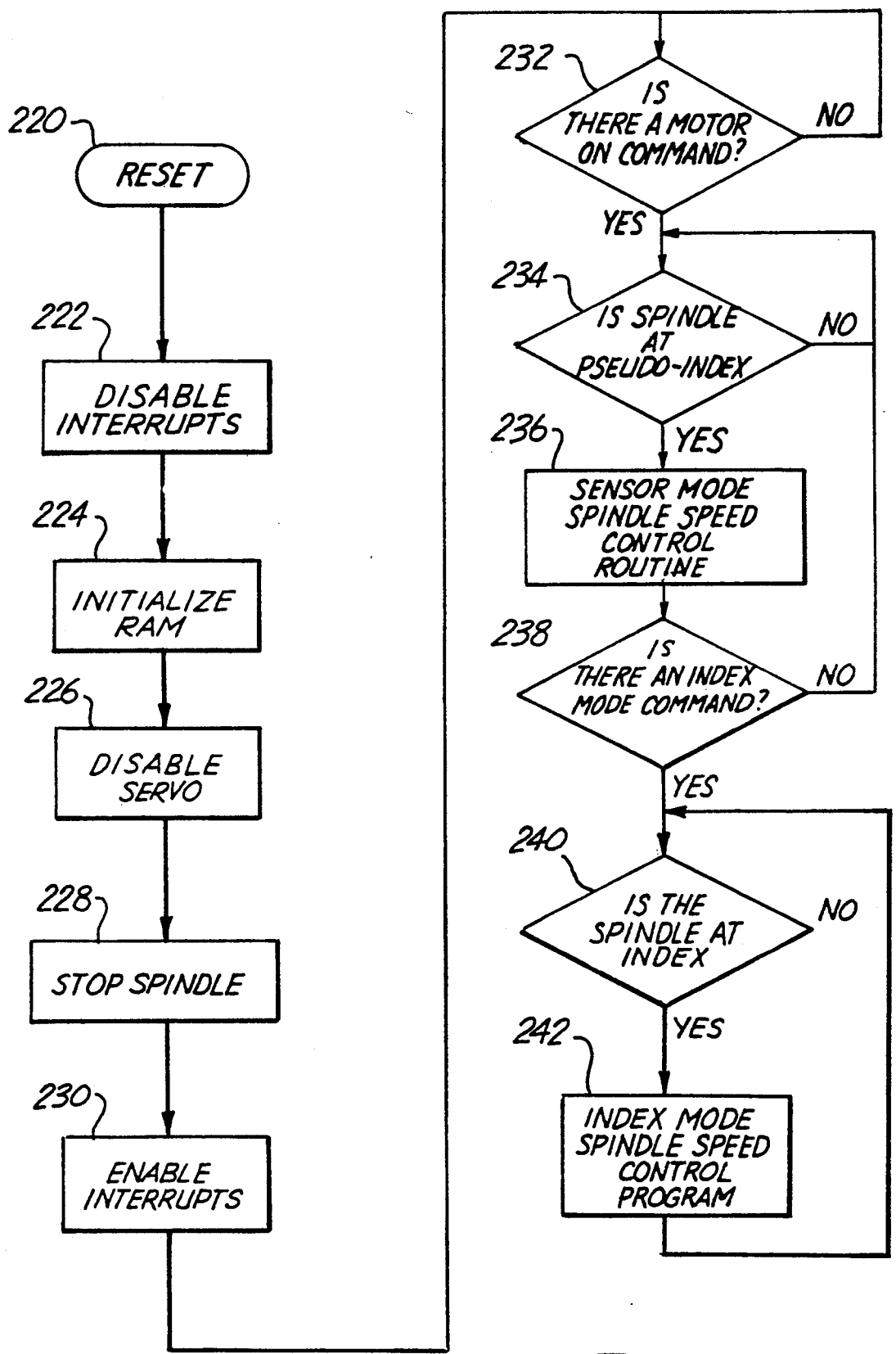
FIG. 6 is a detailed flow chart of the foreground program containing the spindle control process according to the presently preferred embodiment of the present invention.

The command receive routine starting at step 176 is one to determine the readiness of the machine to receive commands and to get necessary commands and parameters into the microprocessor memory for execution by the microprocessor. In particular, a decision is made at step 186 to determine whether or not the apparatus is ready to receive a new command, and if so, to receive commands from host processor 14 or microcomputer 12 through mailbox 20 and to receive parameters from parameter ROM 18 (step 188). Command number 174 is set at step 190, and a "command received" status is set in the status register of the microprocessor at step 192. After completion of the command receive routine, the command processor exits and the interrupt ends to return to the spindle control in the foreground routine (FIG. 6). If the decision at step 186 was that the apparatus is not ready for a new command, then temperature calibration and an output of the temperature compensation value is provided to the microprocessor for compensation of thermal conditions within the disc drive.

Figure 5B:
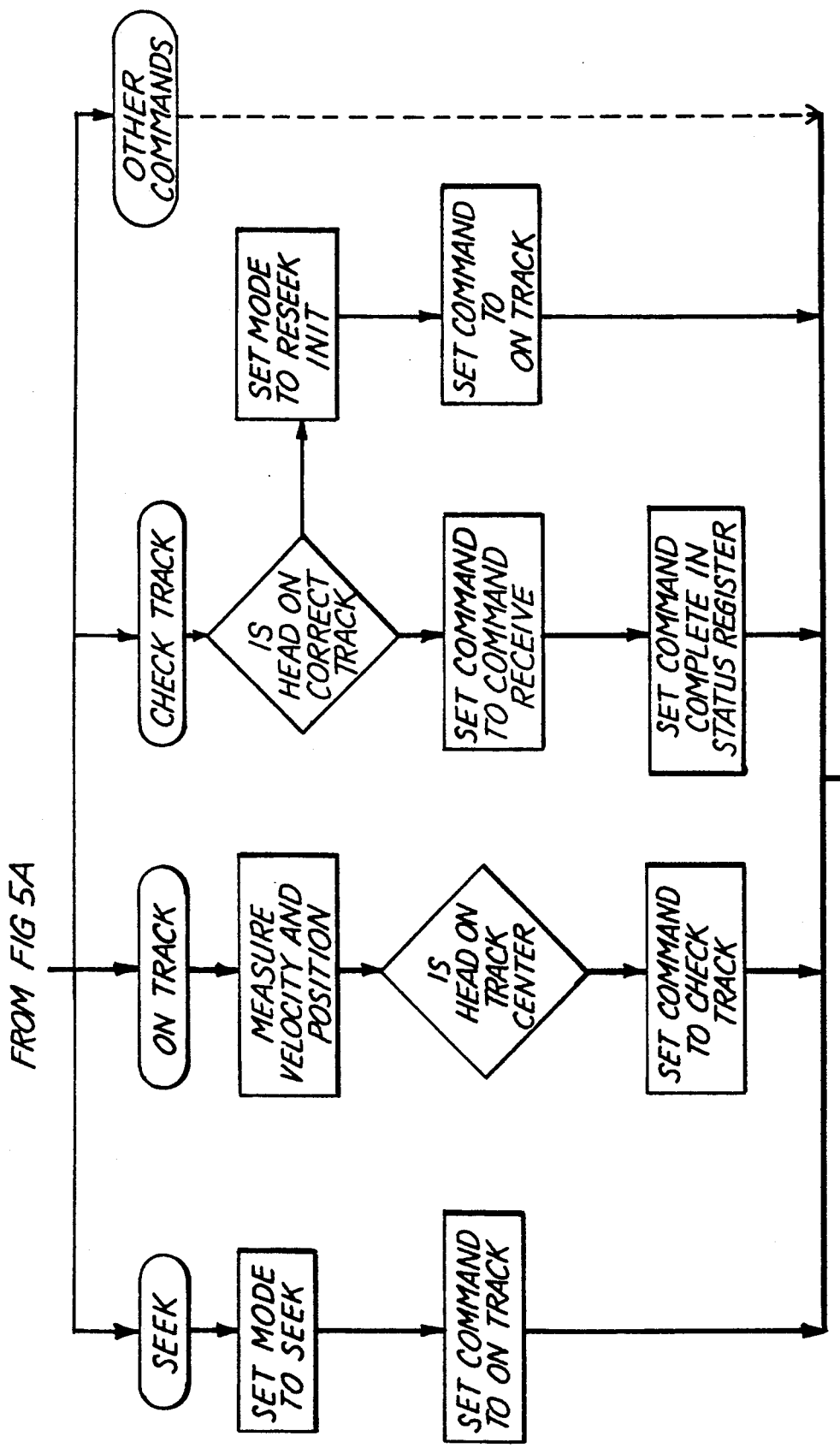

The seek, on-track, and check track routines illustrated in FIG. 5B are illustrative of the command and control executed by the servo control process. The seek command, commencing at step 178, operates microprocessor 22 to set mode number 68 (FIG. 4A) to the seek initialize mode at step 200 and it sets the command number 174 to the on track command at step 202. The routine then exits so that on the next interrupt, the seek initialize mode of the actuator routines (FIG. 4F) operates to start a seek routine, setting the mode number to the seek type, such as fast or slow velocity. When the servo routine following the seek initialize mode is executed, the operation goes immediately to the on track command because that command number is set by command number 174. At step 204, the velocity and position of the head are measured. At step 206, it is determined whether or not the head is on track center. Presumably, at the start of a seek operation, the head is not on track center, so the servo control routine exits so that during the next interrupt cycle, the high or low velocity mode control operates the actuator to move the head to the destination track.

During the interrupt period that the system determines that the head is on the destination track (step 110 in FIG. 4D and step 206 in FIG. 5B), control is given to the fine seek mode (FIG. 4E) and when track center is reached, the command number is set at step 108 to the check track command.

With the head tracking on or near the center of the desired track, the fine control of the actuator control continues to maintain track center position while the check track command (FIG. 5B) determines whether the head is on the correct track at step 210. If the head is on the correct track, the command number is set to the command receive routine at step 212 and the status register is reset at step 214 to indicate a "command complete" condition. If the head is not at the correct track, mode number 68 is changed to the reset initialize mode at step 216 and the command number is changed to the on track command at step 218, and those routines are repeated until the correct track is obtained.

FIG. 6 illustrates the flow chart for initializing the system and setting up the index and interrupts. Upon reset of the system at step 220, the interrupts are disabled at step 222 and random access memory 24 is initialized at step 224. The servo is disabled at step 226 and the spindle stopped by the spindle control routine at step 228. The interrupts are enabled at step 230 and a decision at step 232 determines whether or not the spindle motor is on. If it is not, the start up routine halts until the motor on command is present. Then the system determines that the spindle is at a pseudo-index at step 234, and if so, operates the microprocessor 22 to execute the sensor mode speed control routine at step 236. If an index mode command is present, microprocessor 22 executes the index mode spindle speed control program at step 242. If the index mode command is not present, the routine branches back to execute the spindle speed control routine in the sensor or the index mode, as indicated. If the spindle is not at the index, the program loops at step 240 until the spindle reaches the index before executing the index mode spindle speed control routine.

The program illustrated in FIG. 6 is the foreground program for operating the spindle control. Each 42 microseconds, on command from microprocessor 22 as established by the control program, an interrupt occurs to the spindle control program illustrated in FIG. 6 to immediately branch to step 60 of FIG. 4A, thereby executing one of the actuator control routines of FIGS. 4C-4F. Upon completion of the actuator control routine, access is given to the servo control routine of FIGS. 5A and 5B to execute one of the command control routines therein illustrated and described above.

At the beginning of the actuator control routines, the actuator control program has access to certain data from the hardware, primarily signal position error, track address, actuator current, signal phases and index data. This data is inputted into the random access memory 24 of the control microprocessor at step 64 (FIG. 4A) to control the actuator current through one of the routines of the actuator control routines of FIGS. 4C-4F. Also, once each 42 microseconds, the thermal compensation program updates its counter to keep track of the radial position of the heads with respect to the index. When the head is sitting on a data cylinder or track, the thermal compensation network uses its count from the index to calculate an output the thermal compensation value at step 198 (FIG. 5A). Also each 42 microseconds, the command and parameters are obtained from the command and parameters register of the data transfer processor or host processor. With the head on a track or data cylinder, the command receive program starting at step 176 (FIG. 5A) checks the command register for a "command available" bit set. If the bit is set, the program gets the command and the parameters from the parameter registers. Within 84 microseconds (two interrupt cycles), the program will set "command received" in the status register of the control microprocessor 22. When the command is completed, the resulting data is in place in the communications register, and the "command complete" bit is set in the status register. Each 16.8 milliseconds (for an approximately 3600 RPM rotating media), index, phase counter, and reference counter data is obtained for processing in the spindle control for the spindle control program illustrated in FIG. 6. This program, of course, is interrupted every 42 microseconds as described above.

When in the fine mode, the actuator control program maintains the position of the read/write head over the center of the selected data cylinder or track. Only the servo control program can change the mode number from fine mode to another mode. If the servo control program received a command, such as from the host processor, to move the read/write head to another cylinder, it will set the mode number to fast access, slow access, or some other mode. This operation schedules the mode to be executed when the next interrupt occurs. Each mode executes once per interrupt. As the read/write head approaches the destination, the present mode will change the mode number and schedule the next mode to be executed.

As an example of a long seek, the servo control program receives a seek command from the host interface. The servo control program changes the mode number to high velocity seek which will execute the high velocity seek routine during each interrupt until the read/write head is close enough to the destination to change to a low velocity seek. When close enough, the high velocity seek routine will change the mode number to the low velocity seek routine, scheduling the low velocity seek routine to execute during the next interrupts. The process of each mode scheduling the next mode continues until the destination track is reached, and the fine mode is again selected.

The servo control program executes in the remaining processor time of the interrupt cycle following each access of the actuator control routine. The servo control routines respond to commands from the host interfaces near to immediately as possible. The servo control routines are programmed in module parts, with each part executing in about 8-16 seconds. One part can be executed, during each interrupt, after the actuator control mode executes.

The servo control is made up of a plurality of routines. If one routine cannot execute to completion before the end of an interrupt cycle, it is coded into several parts, each part being assigned a different command number, and one part being executed during each interrupt cycle. As an example, a given routine may be coded into a plurality of segments, each segment having a unique command number. When the "command receive" routine receives a request from the host interface to do a given routine, the command number equal of the first segment of the routine is set at command number 174 (at step 190 in FIG. 5A). That command segment executes during the next interrupt and sets the command number to the next segment. Likewise, the second segment executes during the second interrupt cycle, setting the command number to the third segment, and the third segment executes during the third interrupt cycle and sets the command number to return to the "command receive" routine. The "command receive" routine executes once each interrupt cycle until a new command is received.

The present invention thus provides scheduling of control processor time utilizing a greater portion of the processor time. The design is such that the idle loops are only in the foreground routine of the spindle control. The design permits the processor to respond to changes in the hardware within the time between interrupts. The design is expandable in all areas of servo control, actuator control and spindle control, without prohibitive limits. The design is flexible and reliable to permit different engineers to independently add new modes and commands, without affecting operations of other modes and commands. Hence, the system is flexible and adds functionality without conflicts in processor resources.

Although the present invention has been described with reference to the preferred embodiment, workers skilled in the art will recognize that changes may be made in form and detail without departing from the spirit and scope of the invention.

What is claimed is:

1. A control architecture for use with a disc drive wherein data are stored on a rotatable media and wherein data are read and written by a sensor in respect to the rotating media and wherein functions are performed in response to commands, the control architecture comprising:
   a memory containing a control program, the control program including an interrupt responsive to a time signal; and
   a microprocessor coupled to the memory to execute the control program, the execution of the control program providing for the performance of a plurality of control processes, including a spin control process for controlling the spin speed of the rotatable media, a servo control process for performing functions on command from the host, and an actuator control process for controlling the position of the sensor with respect to the rotatable media, the control program setting the priority for the control processes in response to an interrupt to provide highest priority to the actuator control process and lowest priority to the spin control process, the microprocessor providing a time signal to initiate the interrupt to execute the actuator control process, servo control process and spin control process in consecutive order.

2. A control architecture as in claim 1 wherein the spin control process is a foreground process and the actuator control process and servo control process are background processes, wherein the interrupt interrupts the spin control process to provide execution of the actuator control process and servo control process.

3. A control architecture as in claim 2 wherein the servo control process is executed after the actuator process.

4. A control architecture as in claim 3 wherein the servo control process comprises a plurality of servo routines, each servo routine having an address identified by a command number, the microprocessor being operable in response to an exit from the actuator process to execute the servo routine at the address identified by a current command number, at least some of the servo routines including an instruction to change the current command number.

5. A control architecture as in claim 3 wherein the actuator control process comprises a plurality of actuator routines, each actuator routine having an address identified by a mode number, the microprocessor being operable in response to an interrupt to execute the actuator routine at the address identified by a current mode number, at least some of the actuator routines including an instruction to change the current mode number.

6. A control architecture as in claim 5 wherein the servo control process comprises a plurality of servo routines, each servo routine having an address identified by a command number, the microprocessor being operable in response to an exit from an actuator routine to execute the servo routine at the address identified by a current command number, at least some of the servo routines including an instruction to change the current command number and at least some of the servo routines including an instruction to change the current mode number.

7. A control architecture as in claim 2 wherein the interrupt exits to the foreground process upon completion of a servo control process, whereby idle loops are limited to the foreground process.

8. A process for operating an actuator control process, a servo control process and a spindle control process in a disc drive wherein data are stored on a rotatable media and wherein data are read and written by a sensor in respect to the rotating media and wherein the actuator control process controls the position of the sensor with respect to the rotatable media and the servo control process performs functions in response to commands and the spin control process controls the spin speed of the rotatable media, the process comprising machine-executed steps of:

providing an interrupt; and executing the actuator control process, servo control process and spin control process in consecutive order in response to the interrupt.

9. A process as in claim 8 wherein the spin control process is a foreground process and the actuator control process and servo control process are background processes, wherein the interrupt interrupts the spin control process to provide execution of the actuator control process and servo control process.

10. A process as in claim 9 wherein the servo control process is performed upon exit from the actuator control process, and wherein the spin control process is performed upon exit from the interrupt.

11. A process as in claim 10 wherein the servo control process comprises a plurality of servo routines, the process further including performing a selected one of the servo routines in response to an exit from the actuator process.

12. A process as in claim 11 further including selecting a different servo routine to be executed after the next interrupt.

13. A process as in claim 9 wherein the actuator control process comprises a plurality of actuator routines, the process further including performing a selected on of the actuator routines in response to an interrupt.

14. A process as in claim 13 further including selecting a different actuator routine to be executed at the next interrupt.

15. A process as in claim 13 wherein the servo control process comprises a plurality of servo routines, the process further including performing a selected one of the servo routines in response to an exit from the actuator process.

16. A process as in claim 15 further including selecting a different servo routine to be executed after the next interrupt.

17. A process as in claim 16 further including selecting a different actuator routine to be executed at the next interrupt.

18. A process as in claim 15 further including selecting a different actuator routine to be executed at the next interrupt.

19. A process as in claim 10 wherein idle loops are limited to the foreground process.

20. A system for operating an actuator control process, a servo control process and a spindle control process in a disc drive wherein data are stored on a rotatable media and wherein data are read and written by a sensor in respect to the rotating media and wherein the actuator control process controls the position of the sensor with respect to the rotatable media and the rotatable media and the servo control process performs functions in response to commands and the spin control process controls the spin speed of the rotatable media, the system comprising:

means for acknowledging an interrupt; and means responsive to the interrupt for executing the actuator control process, servo control process and spin control process in consecutive order in response to the interrupt.

* * * * *

UNITED STATES PATENT AND TRADEMARK OFFICE
CERTIFICATE OF CORRECTION

PATENT NO. : 5,305,447
DATED : April 19, 1994
INVENTOR(S) : RANDALL D. HAMPSHIRE It is certified that error appears in the above-indentified patent and that said Letters Patent is hereby corrected as shown below:

Col. 3, lines 34-35, after "timing", insert a period, and delete ",as well as the velocity profiles for seek operations."

Col. 3 line 41, delete "such", insert --seek--

Col. 12, line 25, delete "on", insert --one--

Signed and Sealed this

Twenty-first Day of February, 1995

Attest:

BRUCE LEHMAN

*Attesting Officer*    *Commissioner of Patents and Trademarks*